United States Patent [19]

Kreske, Jr.

[11] 3,779,324

[45] Dec. 18, 1973

[54] INCREASED TRACTION RACING MOTOR VEHICLE

[76] Inventor: Alvin Kreske, Jr., 2504 N. Calumet, Valparaiso, Ind.

[22] Filed: Jan. 21, 1972

[21] Appl. No.: 219,660

[52] U.S. Cl.............. 180/1 R, 134/123, 152/208, 291/1
[51] Int. Cl...... B60b 39/02, B60c 27/00, B60s 3/00
[58] Field of Search .................. 62/3; 134/45, 123; 152/208; 180/1 R; 291/1

[56] References Cited
UNITED STATES PATENTS

| | | | |
|---|---|---|---|
| 2,388,114 | 10/1945 | Boyce ............................... | 180/1 R |
| 2,684,123 | 7/1954 | Mattis ............................... | 180/1 R |
| 2,832,619 | 4/1958 | Davis ................................. | 291/1 |
| 2,933,337 | 4/1960 | Katz .................................. | 291/1 |
| 3,077,743 | 2/1963 | De Faria E Castro et al........... | 62/3 |
| 3,256,920 | 6/1966 | Byrers ............................... | 152/208 |
| 3,336,064 | 8/1967 | Dzaack .............................. | 291/1 |

Primary Examiner—Gerald M. Forlenza
Assistant Examiner—Howard Beltran
Attorney—Marshall A. Burmeister et al.

[57] ABSTRACT

A device and for applying a liquid cleaning agent to the driving wheels of a racing vehicle to permit the tires to become more adherent to the track surface comprising a pressure tank containing the liquid cleaning agent and an under pressure conduit means leading from the tank to the rubber tires on the rear driving wheels of the vehicle, a filler cap for applying the liquid cleaner to the pressure tank, and a stem with a valve connected to the filler cap adapted to communicate with the nozzle of an air pressure source for applying air under pressure to the pressure tank.

4 Claims, 3 Drawing Figures

PATENTED DEC 18 1973  3,779,324

INCREASED TRACTION RACING MOTOR VEHICLE

This invention relates to the treatment of the tires of a racing vehicle to improve its performance. More particularly, the invention relates to a device for applying a liquid to the tires of driving wheels of a drag racing vehicle.

Prior to the commencement of a drag race it is customary for the driver to bring the engine and the rear driving wheels of the racing vehicle to a high speed while the racing vehicle is overcoming the inertia of rest in order to produce a heated and cleaned condition of the driving tires. This requires slipping of the tires on the driving vehicles against the pavement, and this is facilitated by the application of a suitable liquid to the tires. The liquid has been applied to the tires in the past by one or more persons, other than the driver, prior to applying power to the wheels. The liquid serves the function of providing a pool which reduces the friction with the surface of the pavement, and permits the vehicle tires to rapidly slip relative to the pavement. As a result, the engine speed moves into the range of maximum horsepower, and the tires heat against the pavement, thereby softening the composition of the tire to provide greater traction against the surface.

If the liquid is applied to the tires externally, prior to starting of the race, the vehicle soon moves from the puddle onto the dry surface of the pavement. The result is that the engine speed is reduced, and the tires spin or slip with respect to the unlubricated surface. In accordance with the present invention, the liquid lubricant can be continuously applied to the tires as the vehicle starts to accelerate, thereby permitting the tires to slip with respect to the pavement even though the vehicle has moved from its initial starting position. Further, the lubricant applied to the tires is preferably a detergent, thereby cleaning the tires as well as lubricating the tires with respect to the pavement. Hence, the tires are prevented from accumulating grease and oil which may reduce the friction between the tires and the pavement and increase slippage between the tires and the pavement after this condition is no longer desirable.

According to the present invention, the liquid is applied to the tires of the vehicle by the operator thereof through a device mounted on the vehicle. This device dispenses with the need for extra persons to apply the liquid and enables the liquid to be applied to the tires as may be required after the vehicle has begun to move.

Further, according to the present invention, the liquid dispenser is lightweight, requires a minimum of operational parts mounted on the vehicle, and is subject to the control of the operator. Hence, the presence of the liquid dispenser on the vehicle does not add appreciably to the mass of the vehicle, thereby hindering its acceleration. Further, the liquid dispenser is located in a position to increase the weight on the driving wheels of the vehicle in order to increase the maximum friction attainable between the tires and the surface of the pavement.

The present invention, and its advantages, is more fully described in the following specification, particularly when viewed in the light of the drawings, in which.

Figure 1:
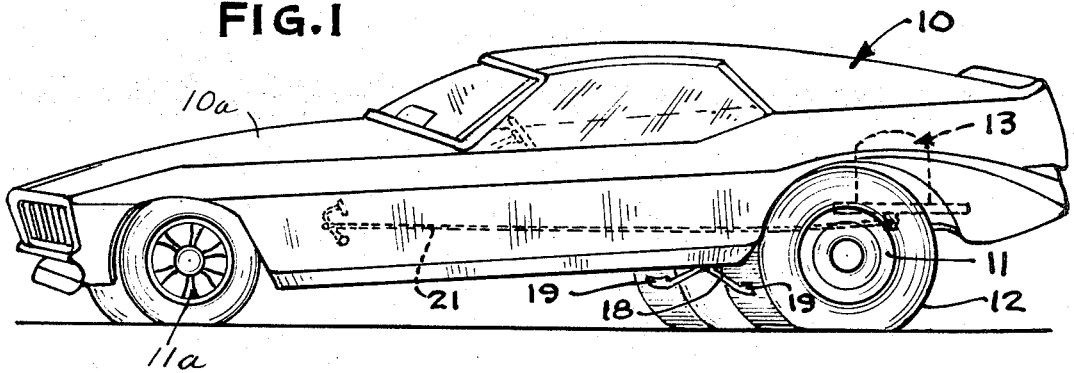
FIG. 1 is a perspective view of a racing vehicle of the type to which the present invention is applied.
Figure 2:
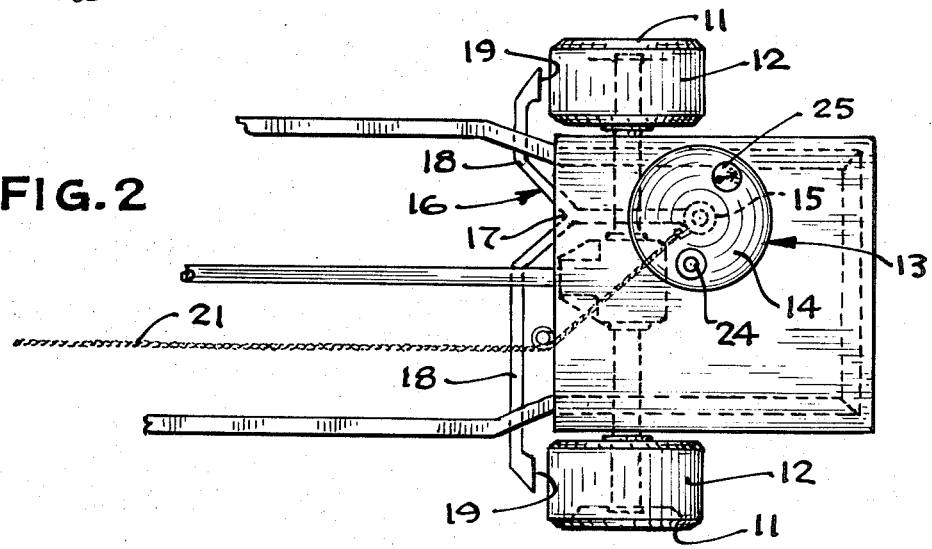
FIG. 2 is a fragmentary view, with parts removed, of the vehicle and the liquid-dispensing device of the present invention.
Figure 3:
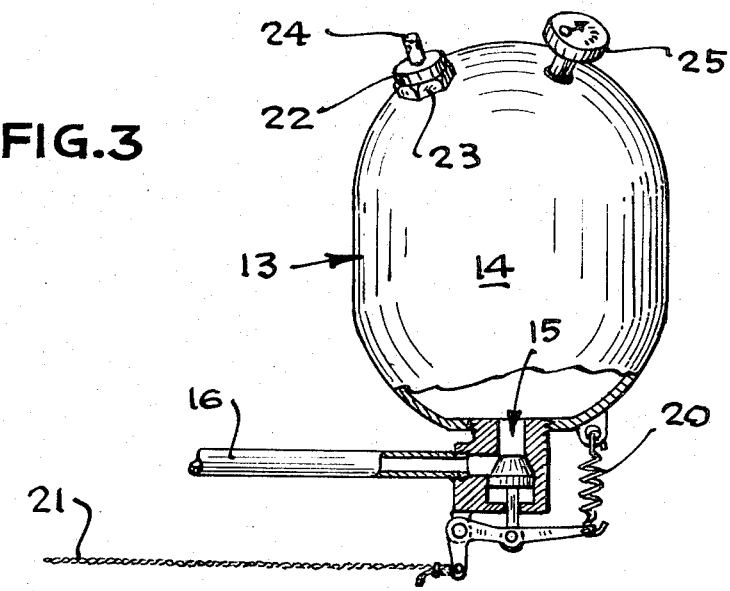
FIG. 3 is a vertical section view of the dispensing device.

A racing vehicle 10, which is best seen in its entirety in FIG. 1, has a body 10a, two rear driving wheels 11 and two front wheels 11a. The driving wheels 11 have wide rubber tires 12 which are devoid of tread as shown in FIG. 2.

The device of the present invention, designated by the reference numeral 13, is mounted at the rear of the vehicle 10. The device 13 includes a pressure container 14 at the bottom of which is located a valve 15. A conduit means 16 is connected at the valve 15 and includes a Y 17, separate pipes 18 connected to the Y 17 and leading toward the rear tires 12, and discharge nozzles 19. The discharge nozzles 19 are adjacent the rear tires 12 and are attached to the ends of the pipes 18 remote from the Y 17. The valve 15 is held closed by a spring 20 and is opened by a control cable 21 extending from the valve 15 to the operator's station on the vehicle 10.

A filler cap 22, which is applied to an opening in the top of the pressure container 14 is provided with an outwardly extending stem 24 and carries a valve 23. The stem 24 is adapted to accomodate the nozzle of a compressed air supply, such as is conventionally used by garages and filling stations to pressurize the tires of a motor vehicle. In this manner, the pressure container 14 may be pressurized without the necessity of carrying on the vehicle apparatus for producing compressed air. A pressure gauge 25 is connected to the container 14.

Upon removal of the filler cap 22, a liquid cleaning agent is supplied in the desired amount to the container 14 through the uncovered top opening therein. The liquid cleaning agent is preferably a water-soluble detergent, otherwise suitable for laundry or dishes, which detergent is anionic, nonionic or cationic in nature.

During operation, the vehicle operator applies the liquid agent to the vehicle tires 12 by pulling on the cable 21 so as to open the valve 15. Now the gas under pressure in the container 14 forces the liquid agent through the valve 15, the Y 17, the pipes 18, and the nozzles 19. Wetting or lubricating of the tires 12 and the adjacent track surface by the liquid agent permits the tires to be spun by the vehicle engine while the vehicle is overcoming rest inertia. As a result, the vehicle engine may reach a desirable speed before the speed of the vehicle becomes appreciable. The supply of the cleaning agent to the tires 12 is reduced or stopped by partial closing or complete closing of the valve 15, thus permitting control of the friction between the tires and the pavement. As the flow of liquid to the tires 12 is reduced, the friction created as the tires continue to spin as they dry off, heats up the tires, causing them to become somewhat sticky and more adherent to the racing surface. Because the liquid is a cleaner, grease and dirt tend to be left with the detergent on the surface of the pavement.

An important thing about the device of the present invention is that it can continue to supply liquid to the tires 12 as needed after the vehicle is moving. Thus, if as the vehicle starts to move, too much friction is generated between the tires and the racing surface because of the reduced flow of the cleansing liquid to the tires, the vehicle operator may increase the flow of liquid as required to reduce the undesirable friction.

Another significant feature of the present invention is that the single container 14 serves not only as a storage container for liquid cleansing agent, but also as a pressure tank for the gas under pressure that pushes out the liquid cleansing agent toward the tires 12 when the valve 15 is opened. Thus, the container 14 has a volume appreciably greater than that of the cleansing agent to be dispensed in a single race, so that as the cleansing agent is pushed out of the container 14, the volume of the gas therein does not increase very much in percentage. The result is that the pressure of the gas in the container 14 does not decrease materially. Consequently, the container 14 alone is sufficient, and it need not be attached during a race to a separate container or other pressure source. Further, it will be recognized that the weight of the container 14 and the other elements of the device for lubricating the tires can be maintained low by proper selection of materials, such as the use of aluminum. The principle addition of mass caused by applicant's device for lubricating and cleaning the tires of the motor vehicle can be restricted to the liquid itself. The additional mass is an advantage in the initial start of the vehicle, since it permits a higher friction between the tires and the surface of the pavement, and this friction can be controlled by the use of lubricant. However, as the vehicle attains higher speed, it is desirable to reduce the mass of the vehicle, which in effect is automatically achieved as a result of discharge of the liquid from the container 14.

Those skilled in the art will readily note additional advantages and used for the present invention beyond those here set forth. It is therefore intended that the scope of the present invention be not limited by the foregoing disclosure, but rather only by the appended claims.

The invention claimed is:

1. A vehicle adapted for racing having a body, a pair of front wheels and a pair of driving rear wheels provided with rubber tires having generally cylindrical road engaging surfaces characterized by the improved construction comprising a tank having a lower and an upper portion mounted in a fixed position on the vehicle adjacent to the rear driving rear wheels thereof adapted to contain a liquid cleaning agent in the lower portion thereof and a substantial quantity of gas in the upper portion thereof, said tank having an opening in the upper portion thereof for partially filling the tank with said liquid cleaning agent and means operatively associated with the tank for injecting gas therein to pressurize the tank with respect to atmospheric pressure including a removable cap for sealing said opening, and conduit means communicating with the lower portion of the tank and extending to a region adjacent to the forward side of each of the driving wheels, said conduit means having a discharge nozzle confronting the generally cylindrical road engaging surface of each of the rubber tires, and said conduit means having a manually actuable normally closed valve for discharging the liquid cleaning agent from the tank.

2. A vehicle comprising the combination of claim 1 wherein the cap is provided with a stem adapted to engage the nozzle of an air hose of a compressed air source, said stem extending through the cap and being provided with a one-way valve for admitting air through the cap and into the tank.

3. A vehicle comprising the combination of claim 1 wherein the tank has an orifice at the bottom thereof and the manually actuable valve of the conduit means is mounted on the tank in communication with the orifice of the tank, in combination with means for actuating said manually actuable valve from a location remote from the valve.

4. A vehicle comprising the combination of claim 3 wherein the conduit means is provided with two sections which interconnect in a region between the manually actuable valve and the sections, each of the sections extending to a nozzle confronting one of the tires.

* * * * *